US010575227B2

(12) United States Patent
Lindoff et al.

(10) Patent No.: US 10,575,227 B2
(45) Date of Patent: *Feb. 25, 2020

(54) NETWORK NODE AND METHOD THEREIN FOR HANDOVER IN WIRELESS COMMUNICATION NETWORK

(71) Applicant: Telefonaktiebolaget L M Ericsson (publ), Stockholm (SE)

(72) Inventors: Bengt Lindoff, Bjarred (SE); Magnus Astrom, Lund (SE); Johan Eker, Lund (SE); Johan Nilsson, Hollviken (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/221,685

(22) Filed: Dec. 17, 2018

(65) Prior Publication Data

US 2019/0124569 A1 Apr. 25, 2019

Related U.S. Application Data

(63) Continuation of application No. 14/651,660, filed as application No. PCT/EP2015/062234 on Jun. 2, 2015, now Pat. No. 10,172,049.

(51) Int. Cl.
*H04W 36/30* (2009.01)
*H04W 36/00* (2009.01)
(Continued)

(52) U.S. Cl.
CPC ..... *H04W 36/0094* (2013.01); *H04L 43/0864* (2013.01); *H04L 43/10* (2013.01);
(Continued)

(58) Field of Classification Search
CPC ... H04W 36/0094; H04W 36/30; H04W 4/70; H04W 36/0016; H04W 48/18; H04L 43/16; H04L 43/0864; H04L 43/10
See application file for complete search history.

(56) References Cited

U.S. PATENT DOCUMENTS 6,490,452 B1   12/2002   Boscovic et al.
6,681,099 B1   1/2004   Keranen et al.
(Continued)

FOREIGN PATENT DOCUMENTS

CN   104410648 A   3/2015
EP   2117170 A1   11/2009
(Continued)

OTHER PUBLICATIONS

Japanese Office Action dated Nov. 9, 2018, in connection with Japanese Application No. 2017561664, 4 pages.
(Continued)

*Primary Examiner* — Lan-Huong Truong
(74) *Attorney, Agent, or Firm* — Leffler Intellectual Property Law, PLLC

(57) ABSTRACT

A network node and method therein for assisting a communication device to perform handover from a serving cell to a target cell in a communication network are disclosed. The network node is configured to obtain a first round trip time between the network node and a server and obtain a second round trip time between a target node in the target cell and the server. The network node is further configured to instruct the communication device to perform handover from the serving cell to the target cell based on at least the first round trip time and the second round trip time.

14 Claims, 3 Drawing Sheets

(51) Int. Cl.
  *H04W 48/18* (2009.01)
  *H04W 4/70* (2018.01)
  *H04L 12/26* (2006.01)

(52) U.S. Cl.
  CPC .............. *H04L 43/16* (2013.01); *H04W 4/70* (2018.02); *H04W 36/0016* (2013.01); *H04W 36/30* (2013.01); *H04W 48/18* (2013.01)

(56) References Cited

U.S. PATENT DOCUMENTS

| | | | |
|---|---|---|---|
| 8,155,051 | B2 | 4/2012 | Kim |
| 9,019,854 | B2 | 4/2015 | Jonsson et al. |
| 9,642,036 | B2 | 5/2017 | Xiao et al. |
| 2002/0094820 | A1 | 7/2002 | Keranen et al. |
| 2005/0192011 | A1 | 9/2005 | Hong et al. |
| 2006/0240813 | A1* | 10/2006 | Baek ..................... H04W 36/02 455/422.1 |
| 2009/0325568 | A1 | 12/2009 | Tabery et al. |
| 2010/0246602 | A1* | 9/2010 | Barreto .................. H04L 49/90 370/466 |
| 2010/0323704 | A1 | 12/2010 | Tailor et al. |
| 2011/0267951 | A1* | 11/2011 | Stanwood ........... H04L 41/5022 370/235 |
| 2011/0319071 | A1 | 12/2011 | Beppler et al. |
| 2012/0076016 | A1* | 3/2012 | Robbins .................. H04L 43/50 370/252 |
| 2012/0177002 | A1 | 7/2012 | Faucher et al. |
| 2012/0327797 | A1 | 12/2012 | Siomina et al. |
| 2014/0064249 | A1 | 3/2014 | Lee et al. |
| 2014/0086123 | A1 | 3/2014 | Deivasigamani et al. |
| 2014/0286313 | A1 | 9/2014 | Fu et al. |
| 2014/0362713 | A1 | 12/2014 | Agarwal et al. |
| 2015/0067819 | A1* | 3/2015 | Shribman ............... H04L 67/06 726/12 |
| 2016/0128090 | A1* | 5/2016 | Azarian Yazdi ...... H04L 5/0048 370/329 |

FOREIGN PATENT DOCUMENTS

| | | | | |
|---|---|---|---|---|
| EP | 2117170 | A1 * | 11/2009 | ........... H04L 1/0021 |
| JP | 2004129164 | A | 4/2004 | |
| JP | 2006324945 | A | 11/2006 | |
| JP | 2007005981 | A | 1/2007 | |
| JP | 2008072451 | A | 3/2008 | |
| JP | 2008538691 | A | 10/2008 | |
| JP | 2009535968 | A | 10/2009 | |
| JP | 2011-166583 | A | 8/2011 | |
| JP | 2011166583 | A | 8/2011 | |
| JP | 2011530895 | A | 12/2011 | |
| KR | 1020140031630 | A | 3/2014 | |

OTHER PUBLICATIONS

English language translation of Summary of Japanese Office Action dated Nov. 9, 2018, in connection with Japanese Application No. 2017561664, 2 pages.
Korean Office Action dated Jan. 3, 2019, in connection with Korean Application No. 10-2017-7037384, 5 pages.
English language translation of Korean Office Action dated Jan. 3, 2019, in connection with Korean Application No. 10-2017-7037384, 4 pages.
Japanese Office Action dated Nov. 16, 2018, in connection with Japanese Application No. 2017-561916, 3 pages.
English language translation of Summary of Japanese Office Action dated Nov. 16, 2018, in connection with Japanese Application No. 2017-561916, 2 pages.
U.S. Pat. No. 6,490,452 B1 issued Dec. 3, 2002.
U.S. Pat. No. 9,019,854 B2 issued Apr. 28, 2015.
U.S. Pat. No. 9,642,036 B2 issued May 2, 2017.
U.S. Pat. No. 6,681,099 B1 issued Jan. 20, 2014.
U.S. Pat. No. 8,155,051 B2 issued Apr. 10, 2012.
U.S. Patent Application Publication No. 2014/0064249 A1 published Mar. 6, 2014.
U.S. Patent Application Publication No. 2012/0076016 A1 published Mar. 29, 2012.
U.S. Patent Application Publication No. 2012/0327797 A1 published Dec. 27, 2012.
U.S. Patent Application Publication No. 2006/0240813 A1 published Oct. 26, 2006.
U.S. Patent Application Publication No. 2015/0067819 A1 published Mar. 5, 2015.
U.S. Patent Application Publication No. 2014/0286313 A1 published Sep. 25, 2014.
U.S. Patent Application Publication No. 2002/0094820 A1 published Jul. 18, 2002.
U.S. Patent Application Publication No. 2014/0362713 A1 published Dec. 11, 2014.
U.S. Patent Application Publication No. 2009/0325568 A1 published Dec. 31, 2009.
U.S. Patent Application Publication No. 2010/0323704 A1 published Dec. 23, 2010.
U.S. Patent Application Publication No. 2012/0177002 A1 published Jul. 12, 2012.
U.S. Patent Application Publication No. 2005/0192011 A1 published Sep. 1, 2005.
EP Patent Application Publication No. 2117170 A1 published Nov. 11, 2009.
PCT International Search Report, dated Jan. 22, 2016, in connection with International Application No. PCT/EP2015/062234.
PCT Written Opinion, dated Jan. 22, 2016, in connection with International Application No. PCT/EP2015/062234.
Non-Final Office Action dated Jul. 28, 2017 in connection with U.S. Appl. No. 14/652,778.
PCT International Search Report, dated Jan. 22, 2016, in connection with International Application No. PCT/EP2015/062234, all pages.
PCT Written Opinion, dated Jan. 22, 2016, in connection with International Application No. PCT/EP2015/062234, all pages.
Non-Final Office Action dated Jul. 28, 2017 in connection with U.S. Appl. No. 14/652,778, 36 pages.
English language translation of Korean Office Action dated Aug. 13, 2019 in connection with Korean Application No. 10-2018-7000020, 3 pages.
Chinese Search Report dated Dec. 23, 2019 in connection with Chinese Application No. 2015800806114, 2 pages.

* cited by examiner

NETWORK NODE AND METHOD THEREIN FOR HANDOVER IN WIRELESS COMMUNICATION NETWORK

CROSS-REFERENCE TO RELATED APPLICATIONS

This application claims the benefit of U.S. application Ser. No. 14/651,660 filed Jun. 11, 2015 (371(c) date), which is a 35 U.S.C. § 371 national stage of international application PCT/EP2015/062234 filed Jun. 2, 2015. All of these earlier applications are hereby incorporated herein by reference in their entireties.

TECHNICAL FIELD

Embodiments herein relate to a network node and a method therein. In particular, they relate to assisting a communication device to perform handover from a serving cell to a target cell in a wireless communication network based on latency.

BACKGROUND

Wireless communication devices may be referred to as mobile telephones, user equipments (UE), wireless terminals, mobile terminals, mobile stations, cellular telephones, smart phones, sensors and actuators with wireless capability, laptops, tablets and phablets, i.e. a combination of a smartphone and a tablet with wireless capability, as well as wireless modems in cars etc. Wireless communication devices are enabled to communicate or operate wirelessly in a Heterogeneous wireless communication system comprising multiple networks or Heterogeneous Networks (HetNet) with access nodes or access points, such as a cellular communications network comprising Second/Third Generation (2G/3G) network, 3G Long Term Evolution (LTE) network, Worldwide interoperability for Microwave Access (WiMAX) network, Wireless Local Area Network (WLAN) or WiFi etc.

The wireless communication device in the present context may be, for example, portable, pocket-storable, hand-held, computer-comprised, vehicle-mounted mobile devices, or any machine-type device, enabled to communicate voice and/or data via an access node with another entity, such as another communication device or a server in the wireless communication system.

5G, i.e. 5th generation mobile networks or 5th generation wireless systems denotes the next major phase of mobile telecommunications standards beyond the current 4th Generation (4G)/International Mobile Telecommunications-Advanced (IMT-Advanced) standards. In a 5G wireless communication system, machine-to-machine communication or Machine-Type Communication (MTC) is one of the major research projects. In order to maintain robust control loop functions in mission and/or time-critical MTC devices, such as communication devices used for in e.g. manufacturing, process industry, automotive or medical applications, communications with higher reliability and lower latency than previously supported in legacy systems e.g. 2nd Generation (2G), 3rd Generation (3G), 4G etc., are required. Message delays over the wireless link as well as a roundtrip time between an MTC device and its destination, e.g. an application server, must be kept low. Typical requirements are, e.g. a maximum message delay of no more than 1 ms and packet error probability of no more than 1e-9. In order to meet such requirements, strict requirements are put on the physical layer to not introduce transport block errors, since in 3G LTE and 4G each retransmission add 8 ms to the message delay. Moreover, interruption of the wireless link must be minimized.

When cellular networks are used to transmit data for high-reliability use cases, e.g. manufacturing, process industry, automotive or medical applications in mission-critical MTC as described above, the robust control loop function requires that message delays over the wireless link must be kept low, in addition to keeping the jitter at a minimum. Depending on the application, the tolerable round-trip delays may not exceed a few milliseconds and predictable timing is also of importance. However, existing wireless systems have in contrast been designed mainly with other use cases in mind, such as voice and internet access, where a latency of 50-200 ms is acceptable, which is however too long for the mission-critical MTC.

Therefore there is a need for improved methods and apparatus for low latency applications in a wireless communication network.

SUMMARY

It is an object of embodiments herein to provide an improved method and network node for low latency applications in a wireless communication network.

According to a first aspect of embodiments herein, the object is achieved by a method performed in a network node for assisting a communication device to perform handover from a serving cell to a target cell in a communication network. The network node is a serving node for the communication device in the serving cell. The network node obtains a first round trip time between the network node and a server. The network node further obtains a second round trip time between a target node in the target cell and the server. The network node then instructs the communication device to perform handover from the serving cell to the target cell based on at least the first round trip time and the second round trip time.

According to a second aspect of embodiments herein, the object is achieved by a network node for assisting a communication device to perform handover from a serving cell to a target cell in a communication network. The network node is configured to obtain a first round trip time between the network node and a server and obtain a second round trip time between a target node in the target cell and the server. The network node is further configured to instruct the communication device to perform handover from the serving cell to the target cell based on at least the first round trip time and the second round trip time.

By instructing the communication device to perform handover from the serving cell to the target cell based on at least the first round trip time between the serving node and a server, and the second round trip time between a target node and the server, the target node with shorter round trip time can be selected, and as a result, the latency for time or mission critical message communication may be reduced.

Thus, embodiments herein provide an improved method for transmission of critical data packets or messages with reduced latency in a wireless communication network by assisting a communication device to perform handover based on round trip times.

BRIEF DESCRIPTION OF THE DRAWINGS

Examples of embodiments herein are described in more detail with reference to attached drawings in which.

DETAILED DESCRIPTION

In order to develop higher reliability and low latency of communications for mission-critical-MTC, one of the key design challenges is to achieve very low latency in the order of 1 ms for data transmission so that new application cases such as real time control of industrial equipment or remote controlled vehicles may be enabled.

As discussed above, the existing wireless systems have too long latency. Further, in some scenarios the amount of data to be transmitted in mission-critical-MTC is not huge, e.g. in industrial automation and remote control applications, messages to be transmitted only contains a few words. Hence in these applications, extreme Signal to Noise Ratios (SNRs) over a radio interface or link might not be required compared to the low latency requirements. For example, a first target node or access point which has strong signals for a certain radio access technology (RAT) may have longer ping time or round trip time to the application server, while another second target node which has weaker signals, but still sufficient for the current application, may have much shorter ping time or round trip time. According to the existing handover procedures, a handover to the first target node may be initiated. Therefore cell selection and reselection or handover procedures which mainly based on SNRs in current communication networks may not be optimized for low latency applications.

Figure 1:
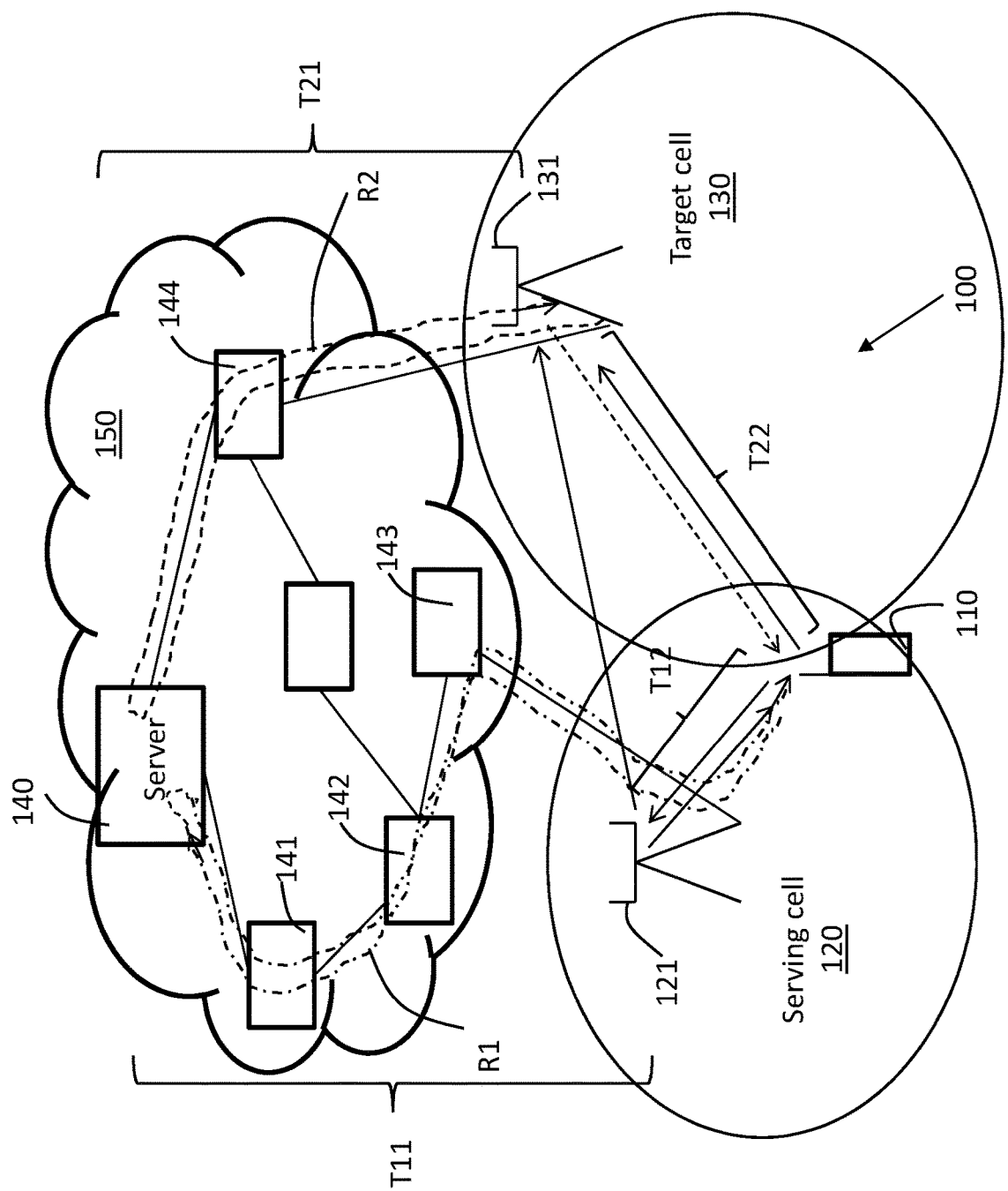
FIG. 1 is a diagram illustrating an example of a wireless communication network.

FIG. 1 depicts an example of a wireless communication network 100 in which embodiments herein may be implemented. The wireless communication network 100 may comprise one or more wireless communication networks such as e.g. any 2G/3G/4G networks, Wimax, WLAN/WiFi etc.

The wireless communications network 100 covers a geographical area which is divided into cell areas or cover areas, wherein each cell area is served by a network node, also referred to as a serving network node, an access node, an access point or a base station. The wireless communication network 100 may comprise a number of cells, each cell supporting communications for a number of communication devices located therein, wherein a serving cell 120 with a serving network node 121, and a target cell 130 with a target node 131, are shown in FIG. 1.

A number of communication devices may operate in the wireless communication network 100, wherein a communication device 110 is shown in FIG. 1. The communication device 110 may, e.g. be any machine type devices with wireless communication capability, or any other radio network units capable to communicate over a radio link in a wireless communications network, e.g. a mobile terminal or station, a wireless terminal, a user equipment, a mobile phone, a computer such as e.g. a laptop, a Personal Digital Assistants (PDAs) or a tablet computer etc. The communication device 110 may communicate with the serving network node 121 in the serving cell 120 and may need to monitor other cells for various purposes, for example, to perform a handover to a neighbour cell or target cell 130.

The wireless communication network 100 may further comprise a number of servers for running different applications or services, and a number of routers for connecting the servers, wherein a server 140, and a number of routers 141, 142, 143, 144, are depicted in FIG. 1. The routers 141, 142, 143, 144 may also be servers. The server 140 and routers 141, 142, 143, 144 may be comprised in a cloud 150, which may also be referred to as a computing environment, network or system.

The communication device 110 may communicate with the server 140 for transmission and receiving data, messages and instructions etc. If the communication device 110 is a mission and/or time-critical MTC device used for communication in e.g. manufacturing, process industry, automotive or medical applications as described above, higher reliability and lower latency for the communication with the server 140 is required in order to maintain robust control loop functions.

As shown in FIG. 1, there are several routes for the communication device 110 to communicate with the server 140. A first route is indicated as a dash-dotted line denoted as R1 to the left of the FIG. 1. In the first route R1, a signal travels from the communication device 110 to the serving network node 121, through the routers 143, 142, 141 and reaches the sever 140, then travels back from the server 140, through the routers 141, 142, 143 and via the serving network node 121 to the communication device 110. The time spent for the signal traveling from the network node 121 to the server 140 and back again is defined as a first round trip time, i.e. the round trip time, or ping-time, from the network node 121 to the server 140 and from the server 140 back to the network node 121, denoted as T11. The time spent on the radio link between the communication device 110 and the network node 121 is denoted as T12.

A second route is indicated as a dashed line denoted as R2 to the right of the FIG. 1. In the second route R2, signal travels from the target node 131 through router/server 144 to the sever 140, then travels back from the sever 140, through router/server 144 to the target node 131. The time spent for the signal traveling between the target node 131 and the server 140 is defined as a second round trip time, i.e. the round trip time from the target node 131 to the server 140 and from the server 140 back to the target node 131, denoted as T21. The time spent on the radio link between the communication device 110 and the target node 131 is denoted as T22.

In some scenarios, the second round trip time T21 may be shorter than the first round trip time T11 although the SNR of the target node 131 is lower. In this case, a handover may be initiated by the network node 121.

Figure 2:
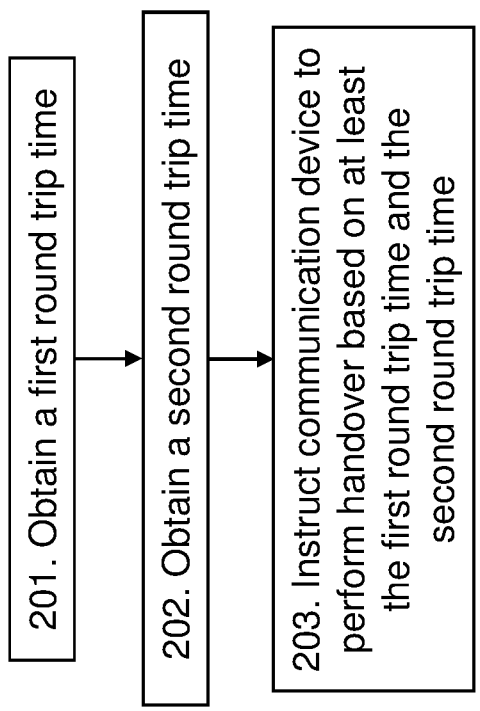
FIG. 2 is a flowchart illustrating one embodiment of a method in a network node.

Example of embodiments of a method performed in a network node 121 for assisting the communication device 110 to perform handover from a serving cell 120 to a target cell 130 in the communication network 100, will now be described with reference to FIG. 2. The network node 121 is a serving node for the communication device 110 in the serving cell 120. The method comprises the following actions, which actions may be taken in any suitable order.

Action 201

The communication device 110 may trig a need or request for handover to a target cell, e.g. the target cell 130 when communications with the server 140 are needed. A handover event may also be triggered by the network node in any 2G/3G/4G networks by monitoring neighbor cells. The handover may be, e.g. an Inter Radio Access Technology (IRAT) handover, i.e. handover between two nodes using different carrier frequencies and different RATs, or an Intra-frequency (IF) handover, i.e. handover between two nodes using same carrier frequency and same RAT, or an Inter-frequency handover, i.e. handover between two nodes using different carrier frequency but same RAT. Here "a need" may be potential and hence made a "long" time prior to an actual handover is needed.

In order to determine if a handover is needed or which target cell to handover for the current application, the network node needs to know the round trip time to the server 140 via the network node 121 and a target node, e.g. the target node 131. Therefore, the network node 121 obtains a first round trip time between the network node 121 and the server 140.

The communication device 110 and/or the network node 121 may already know the first round trip time from an earlier measurement or application procedure. In this embodiment the network node 121 may obtain the first round trip time by collecting this information that it may have stored earlier or receiving it from the communication device 110. If it is unknown to the network node 121 or needs to be updated, according to some other embodiments, the network node 121 may obtain the first round trip time through measurement by sending a ping signal to the server 140. The ping signal may be a ping signal according to the Internet Control Message Protocol, e.g. an ICMP-ping signal or may be a signal included in a cellular control packet, containing a latency measurement request, or any other latency measurement request.

According to some embodiments, the network node 121 may instruct the server 140 to perform a ping test for measuring the first round trip time. The network node 121 may obtain the first round trip time by receiving information about the first round trip time measurement from the server 140.

Action 202

The network node 121 obtains a second round trip time between a target node 131 in the target cell 130 and the server 140. There are several ways to obtain the second round trip time.

According to some embodiments, the network node 121 sends information on the Internet Protocol (IP) address of the server 140 to the target node 131 and instructs the target node 131 to do a ping test for measuring the second round trip time. The server 140's IP address may be received from the communication device 110.

The target node 131 does a ping test and the network node 121 obtains the second round trip time by receiving information about the second round trip time measurement from the target node 131.

According to some embodiments, the network node 121 sends information on IP address or a cell identity of the target node 131 to the server 140 and instructs the server 140 to perform a ping test for measuring the second round trip time. The target node 131 may in some embodiments be identified by the cell identity, either local or global depending on the RAT etc., or by a pure IP-address, in case the communication device 110 has gotten that information when detecting the target node 131 and sends the IP address to the network node 121. In some other embodiments, the network node 121 may determine, via a request over the backhaul network or a look-up table, the IP address of the target node 131.

The server 140 does a ping test and the network node 121 obtains the second round trip time by receiving information about the second round trip time measurement from the server 140.

According to some embodiments, if the serving cell 120 and the target cell 130 does not have any backhaul connection, e.g. a handover from 2G/3G/4G networks to WiFi or WLAN, or the serving cell 120 determines that interaction with the target cell 130 is not possible, the network node 121 may configure a measurement gap, i.e. the network node 121 provides a time gap in the scheduling of the communication device 110 where no downlink or uplink scheduling occurs, for the communication device 110 to measure the second round trip time by sending a ping signal from the communication device 110 to the server 140 via the target node 131.

According to some embodiments, the communication device 110 may not need measurement gaps, since it has capability to have more than one connection ongoing simultaneously, e.g. via a second transmission chain. Then the communication device 110 may configure the second transmission chain to connect to the target cell 130 and do a ping-test via the target node 131.

The network node 121 then obtains the second round trip time by receiving information about the second round trip time measurement from the communication device 110. In this case, the second round trip time includes the time T21 spent on the radio link between the communication device 110 and the target node 131. T21 is usually much shorter than the second round trip time and the measurement by the communication device 110 may be used as an estimation to the second round trip time.

Action 203

After the network node 121 have obtained the first round trip time and the second round trip time, the network node 121 instructs the communication device 110 to perform handover from the serving cell 120 to the target cell 130 based on at least the first round trip time and the second round trip time.

By instructing the communication device to perform handover from the serving cell to the target cell based on at least the first round trip time between the serving node and a server, and the second round trip time between a target node and the server, the target node with shorter round trip time can be selected, and as a result, the latency for time or mission critical message communication may be reduced.

If the communication device 110 have informed the network node 121 about acceptable latency, or a pre-determined threshold, for a current mission-critical application, the network node 121 may compare the first round trip time and the second round trip time and choose the connection with the ping-time that fulfills that requirement.

According to some embodiments, the network node 121 instructs the communication device 110 to perform handover from the serving cell 120 to the target cell 130 if the first round trip time is longer than the second round trip time.

According to some embodiments, the network node 121 instructs the communication device 110 to perform handover from the serving cell 120 to the target cell 130 if the second round trip time is longer than the first round time but shorter than a pre-determined threshold and signal quality is better than the serving cell 120.

The network node 121 may in some embodiments instruct the target node 131 to keep the route, e.g. the route R2, to the server active, i.e., not to time-out and thereby increasing latency at handover.

According to embodiments herein, if the target node 131 has shorter round trip time than the serving network node 121, a handover to the target cell 130 is initiated. As a result, the latency for mission critical message communication can be reduced. The method may also apply to other scenarios, e.g. where a first target node or access point which has strong signals for a certain radio access technology (RAT) may have longer ping time or round trip time to the application server, while another second target node which has weaker signals, but still sufficient for the current application, may have much shorter ping time or round trip time, then the second target node should be chosen from the current used application perspective.

Figure 3:
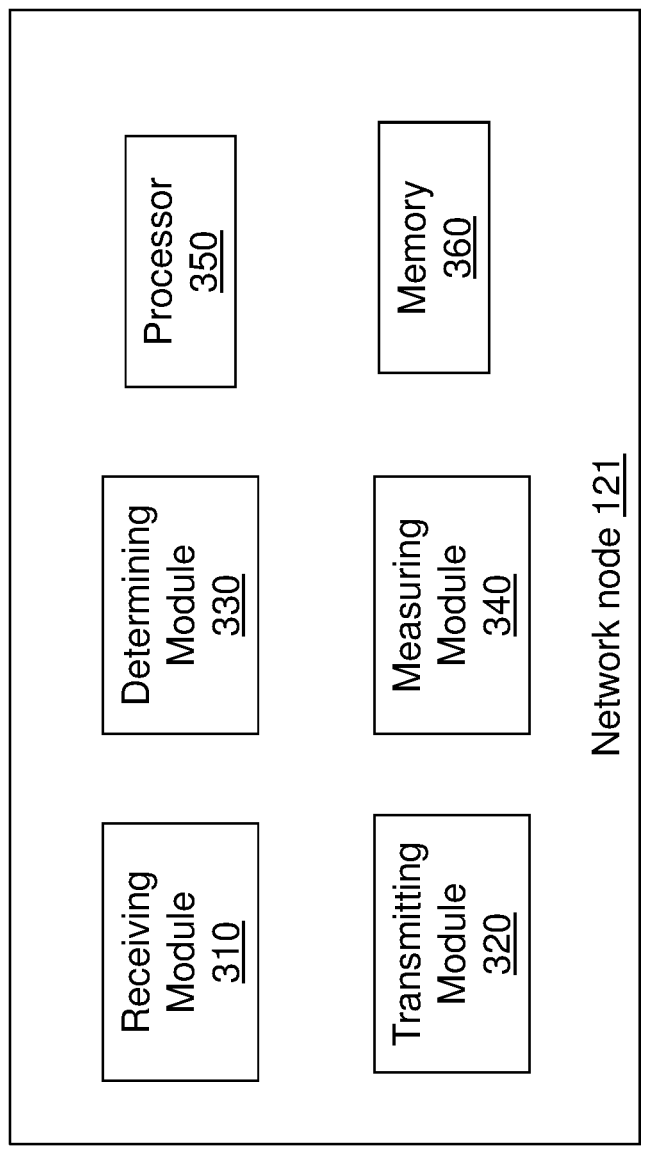
FIG. 3 is a schematic block diagram illustrating embodiments of a network node.

To perform the method actions in the network node 121 for assisting the communication device 110 to perform handover from the serving cell 120 to the target cell 130 in the communication network 10, described above in relation to FIG. 2, the network node 121 comprises the following circuits or modules depicted in FIG. 3. As mentioned above, the wireless communication network 100 comprises any one or more 2G/3G/4G networks, Wimax, WLAN/WiFi etc. The network node 121 may comprise, e.g. a receiving module 310, a transmitting module 320, a determining module 330, a measuring module 340.

The network node 121 is configured to, e.g. by means of the receiving module 310 configured to, obtain a first round trip time between the network node 121 and the server 140.

According to some embodiments, the network node 121 may already know the first round trip time from an earlier measurement or application procedure. If it is unknown, according to some embodiments, the network node 121 may obtain the first round trip time by measurement, and may be configured to, by means of the measuring module 340 configured to, measure the first round trip time by sending a ping signal to the server 140.

According to some embodiments, the network node 121 may be configured to instruct the server 140 to perform a ping test for measuring the first round trip time and receive information about the first round trip time measurement from the server 140.

The network node 121 is further configured to, e.g. by means of the receiving module 310 configured to, obtain a second round trip time between a target node 131 in the target cell 130 and the server 140.

According to some embodiments, the network node 121 is configured to, by means of the transmitting module 321 configured to, send information on IP address of the server 140 to the target node 131 and instruct the target node 131 to do a ping test for measuring the second round trip time. The server 140's IP address may be received from the communication device 110.

The target node 131 does a ping test and the network node 121 receives information about the second round trip time measurement from the target node 131.

According to some embodiments, the network node 121 is configured to, by means of the transmitting module 321 configured to, send information on IP address or a cell identity of the target node 131 to the server 140 and instructs the server 140 to perform a ping test for measuring the second round trip time.

The server 140 does a ping test and the network node 121 receives information about the second round trip time measurement from the server 140.

According to some embodiments, the network node 121 is configured to, by means of the determining module 330 configured to, configure a measurement gap for the communication device 110 to measure the second round trip time by sending a ping signal from the communication device 110 to the server 140 via the target node 131.

The network node 121 receives information about the second round trip time measurement from the communication device 110.

The network node 121 is further configured to, e.g. by means of the transmitting module 320 and determining module 330 configured to, instruct the communication device 110 to perform handover from the serving cell 120 to the target cell 130 based on at least the first round trip time and the second round trip time.

If the communication device 110 have informed the network node 121 about acceptable latency, or a pre-determined threshold, for the current application, the network node 121 may compare the first round trip time and the second round trip time and choose the ping-time which fulfills that requirement.

According to some embodiments, the network node 121 is configured to, e.g. by means of the transmitting module 320 and determining module 330 configured to, instruct the communication device 110 to perform handover from the serving cell 120 to the target cell 130 if the first round trip time is longer than the second round trip time.

According to some embodiments, the network node 121 is configured to, e.g. by means of the transmitting module 320 and determining module 330 configured to, instruct the communication device 110 to perform handover from the serving cell 120 to the target cell 130 if the second round trip time is longer than the first round time but shorter than a pre-determined threshold and signal quality is better than the serving cell 120.

Those skilled in the art will appreciate that the receiving module 310, transmitting module 320, determining module 330 and measuring module 340 described above may be referred to one module, a combination of analog and digital circuits, one or more processors, such as processor 350, depicted in FIG. 3, configured with software and/or firmware and/or any other digital hardware performing the function of each module. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC).

The network node 121 may further comprise a memory 360 comprising one or more memory units. The memory 360 is arranged to be used to store information, e.g. IP addresses, lists of target cells, measurements and data, as well as configurations to perform the methods herein when being executed in the network node 121.

The embodiments herein in network node 121 for assisting the communication device 110 to perform handover from the serving cell 120 to the target cell 130 in the wireless communication system 100, may be implemented through one or more processors, such as the processor 350 in the network node 121 together with computer program code for performing the functions and actions of the embodiments herein. The program code mentioned above may also be provided as a computer program product, for instance in the form of a data carrier carrying computer program code for performing the embodiments herein when being loaded into the network node 121. One such carrier may be in the form of a CD ROM disc. It is however feasible with other data carriers such as a memory stick. The computer program code may furthermore be provided as pure program code on a server and downloaded to the network node 121.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed in a network node for assisting a communication device to perform handover from a serving cell to a target cell in a communication network, wherein the network node is a serving node for the communication device in the serving cell, the method comprising:
   obtaining a first round trip time between the network node and an application server that provides, to the communication device, one or both of an application and control loop functionality;
   obtaining a second round trip time between a target node in the target cell and the application server;
   instructing the communication device to perform handover from the serving cell to the target cell based on at least the first round trip time and the second round trip time,
   wherein instructing the communication device to perform handover from the serving cell to the target cell comprises:
   instructing the communication device to perform handover from the serving cell to the target cell if the first round trip time is longer than the second round trip time.

2. The method according to claim 1, wherein obtaining a first round trip time comprises sending a ping signal to the application server and measuring the first round trip time by the network node.

3. The method according to claim 1, wherein obtaining a first round trip time comprises:
   instructing the application server to perform a ping test for measuring the first round trip time; and
   receiving information about the first round trip time measurement from the application server.

4. The method according to claim 1, wherein obtaining a second round trip time comprises:
   sending information on Internet Protocol (IP) address of the application server from the network node to the target node;
   instructing the target node to do a ping test for measuring the second round trip time;
   receiving information about the second round trip time measurement from the target node.

5. The method according to claim 1, wherein obtaining a second round trip time comprises:
   sending information on IP address or a cell identity of the target node to the application server;
   instructing the application server to perform a ping test for measuring the second round trip time;
   receiving information about the second round trip time measurement from the application server.

6. The method according to claim 1, wherein obtaining a second round trip time between the target node and the application server comprises:
   configuring a measurement gap for the communication device to measure the second round trip time by sending a ping signal from the communication device to the application server via the target node;
   receiving information about the second round trip time measurement from the communication device.

7. The method according to claim 1, wherein instructing the communication device to perform handover from the serving cell to the target cell comprises:
   instructing the communication device to perform handover from the serving cell to the target cell if the second round trip time is longer than the first round time but shorter than a pre-determined threshold and a signal quality of the target cell is better than the serving cell.

8. A network node for assisting a communication device to perform handover from a serving cell to a target cell in a communication network, wherein the network node is a serving node for the communication device in the serving cell, the network node is configured to:
   obtain a first round trip time between the network node and an application server that provides, to the communication device, one or both of an application and control loop functionality;
   obtain a second round trip time between a target node in the target cell and the application server; and
   instruct the communication device to perform handover from the serving cell to the target cell based on at least the first round trip time and the second round trip time,
   wherein the network node is further configured to:
   instruct the communication device to perform handover from the serving cell to the target cell if the first round trip time is longer than the second round trip time.

9. The network node according to claim 8, wherein the network node is further configured to send a ping signal to the application server and measuring the first round trip time.

10. The network node according to claim 8, wherein the network node is further configured to:
    instruct the application server to perform a ping test for measuring the first round trip time;
    receive information about the first round trip time measurement from the application server.

11. The network node according to claim 8, wherein the network node is further configured to:
    send information on Internet Protocol (IP) address of the application server to the target node;
    instruct the target node to do a ping test for measuring the second round trip time; and
    receive information about the second round trip time measurement from the target node.

12. The network node according to claim 8, wherein the network node is further configured to:
    send information on IP address or a cell identity of the target node to the application server;
    instruct the application server to perform a ping test for measuring the second round trip time;
    receive information about the second round trip time measurement from the application server.

13. The network node according to claim 8, wherein the network node is further configured to:
    configure a measurement gap for the communication device to measure the second round trip time by sending a ping signal from the communication device to the application server via the target node; and
    receive information about the second round trip time measurement from the communication device.

14. The network node according to claim 8, wherein the network node is further configured to:
    instruct the communication device to perform handover from the serving cell to the target cell if the second round trip time is longer than the first round time but shorter than a pre-determined threshold and a signal quality of the target cell is better than the serving cell.

* * * * *